US012760390B2

(12) United States Patent
Paquin et al.

(10) Patent No.: US 12,760,390 B2
(45) Date of Patent: Oct. 13, 2026

(54) PURIFICATION OF SCANDIUM CONCENTRATE

(71) Applicant: RIO TINTO IRON AND TITANIUM CANADA INC., Sorel-Tracy (CA)

(72) Inventors: Michel Paquin, Bécancour (CA); Simon Roy, Sorel-Tracy (CA)

(73) Assignee: RIO TINTO IRON AND TITANIUM CANADA INC., Sorel-Tracy (CA)

( * ) Notice: Subject to any disclaimer, the term of this patent is extended or adjusted under 35 U.S.C. 154(b) by 1088 days.

(21) Appl. No.: 17/771,745

(22) PCT Filed: Oct. 26, 2020

(86) PCT No.: PCT/CA2020/051432
§ 371 (c)(1),
(2) Date: Apr. 25, 2022

(87) PCT Pub. No.: WO2021/081629
PCT Pub. Date: May 6, 2021

(65) Prior Publication Data
US 2022/0411893 A1 Dec. 29, 2022

Related U.S. Application Data

(60) Provisional application No. 62/926,708, filed on Oct. 28, 2019.

(51) Int. Cl.
*C22B 3/42* (2006.01)
*B01J 39/05* (2017.01)
(Continued)

(52) U.S. Cl.
CPC ................. *C22B 3/42* (2013.01); *B01J 39/05* (2017.01); *B01J 39/17* (2017.01); *B01J 47/016* (2017.01);
(Continued)

(58) Field of Classification Search
CPC .... C22B 3/42; C22B 3/10; C22B 3/22; C22B 59/00; C22B 3/06; B01J 39/05;
(Continued)

(56) References Cited

U.S. PATENT DOCUMENTS 4,765,909 A * 8/1988 Rourke .................... C01F 15/00 423/21.5
4,816,233 A * 3/1989 Rourke ..................... C22B 3/42 423/21.5
(Continued)

FOREIGN PATENT DOCUMENTS

CA 2894593 A1 6/2014
CN 102070162 A 5/2011
(Continued)

OTHER PUBLICATIONS

Jan. 5, 2021—(WO) International Search Report and Written Opinion—PCT/CA2020/051432.
(Continued)

*Primary Examiner* — Wayne A Langel
*Assistant Examiner* — Syed T Iqbal
(74) *Attorney, Agent, or Firm* — Banner & Witcoff, Ltd.

(57) ABSTRACT

In order to reduce the contamination of scandium oxide products, the present disclosure provides a process for removing at least one metal contaminant from a scandium (Sc) concentrate. The process is based on contacting the Sc concentrate with an ion exchange resin to obtain a purified Sc eluate or raffinate. The first ion exchange resin and the second ion exchange resin are strong acid cationic resins with sulfonic acid functional groups in a potassium or sodium form. The purified Sc eluate or raffinate can be used to make scandium oxide products having a reduced amount of metal ion contaminants.

16 Claims, 3 Drawing Sheets

(51) Int. Cl.

| | |
|---|---|
| ***B01J 39/17*** | (2017.01) |
| ***B01J 47/016*** | (2017.01) |
| ***B01J 47/026*** | (2017.01) |
| ***B01J 47/15*** | (2017.01) |
| ***C22B 3/10*** | (2006.01) |
| ***C22B 3/22*** | (2006.01) |
| ***C22B 59/00*** | (2006.01) |

(52) U.S. Cl.
CPC ............. *B01J 47/026* (2013.01); *B01J 47/15* (2017.01); *C22B 3/10* (2013.01); *C22B 3/22* (2013.01); *C22B 59/00* (2013.01)

(58) Field of Classification Search
CPC ........ B01J 39/17; B01J 47/016; B01J 47/026; B01J 47/15; B01D 11/028; B01D 9/0054; B01D 11/0288; Y02P 10/20
See application file for complete search history.

(56) References Cited

U.S. PATENT DOCUMENTS

| | | | | |
|---|---|---|---|---|
| 5,273,725 | A * | 12/1993 | Carlson ................... | C22B 47/00 423/3 |
| 2013/0104700 | A1* | 5/2013 | Gisch ....................... | B01J 39/07 75/743 |
| 2014/0042359 | A1 | 2/2014 | Fuhrmann et al. | |
| 2014/0193317 | A1 | 7/2014 | Hartley et al. | |
| 2015/0361524 | A1 | 12/2015 | Sainio et al. | |
| 2016/0340757 | A1 | 11/2016 | Higaki et al. | |
| 2019/0078175 | A1* | 3/2019 | Xu .......................... | C22B 59/00 |

FOREIGN PATENT DOCUMENTS

| | | | |
|---|---|---|---|
| DE | 102011004534 | A1 | 8/2012 |
| IN | 2555KOLNP2013 | | 12/2013 |
| JP | H01502976 | A | 10/1989 |
| JP | H08232026 | A | 9/1996 |
| RU | 94035144 | A | 7/1996 |
| WO | 2014066727 | A1 | 5/2014 |
| WO | 2014/110216 | A1 | 7/2014 |
| WO | 2014/181721 | A1 | 11/2014 |
| WO | 2019/099859 | A1 | 5/2019 |

OTHER PUBLICATIONS

Felipe et al., "Recovery of Rare Earth Elements from Acid Mine Drainage", Sustainable Industrial Processing Summit SIPS 2017 vol. 1. Barrios Intl. Symp. / Non-ferrous Smelting & Hydro/ Electrochemical Processing, pp. 198-207, Dec. 1, 2017.
Oct. 6, 2023—(EP) Office Action—App 20881662.9.
Feb. 9, 2024—(CN) Office Action—App 2020800752882.
Feb. 9, 2024—(CN) Office Action—App 202080075288—Eng Trans.
Feb. 9, 2024—(CN) Search Report—App 202080075288.
Oct. 25, 2024—(JP) Office Action—App No. 2022-524924.
Mar. 3, 2023—(CA) Office Action—App 3158475.

* cited by examiner

PURIFICATION OF SCANDIUM CONCENTRATE

CROSS-REFERENCE TO RELATED APPLICATIONS

The present application is a U.S. National Stage application under 35 U.S.C. § 371 of International Application PCT/CA2020/051432, filed Oct. 26, 2020, which claims the benefit of priority to U.S. Provisional Patent Application Ser. No. 62/926,708, filed on Oct. 28, 2019, and the present application claims the benefit of the filing date of each of these prior applications, which are hereby incorporated by reference in their entireties.

TECHNOLOGICAL FIELD

The present disclosure relates to processes for reducing the contamination in a scandium concentrate using ion exchange resins.

BACKGROUND

Scandium (Sc) oxide products can be contaminated with metal contaminants which may, in some embodiments, be radioactive. Contamination, especially with radioactive metal contaminants, is problematic as it may limit the transport of the Sc oxide product and reduce its commercial value.

It would be highly desirable to be provided with a process for reducing the contamination of metal contaminants in the Sc concentrate in order to make a Sc oxide product having a level of 500 ppm (or below) of metal contaminants.

BRIEF SUMMARY

The present disclosure concerns the use of a strong acid cationic resin (such as a sulfonate ion exchange resin) for reducing the contamination in a scandium concentrate.

In a first aspect, the present disclosure provides a process for removing at least one metal contaminant from a scandium (Sc) concentrate. The process comprises contacting the Sc concentrate with an acidic solution so as to produce an impure Sc solution. In one embodiment of the process, the process comprises contacting the impure Sc solution with a first ion exchange resin capturing the at least one metal contaminant so as to produce a first ion exchange resin complex and a purified Sc raffinate solution, wherein the first ion exchange resin has more affinity for the at least one metal contaminant than for Sc and optionally eluting Sc from the first ion exchange resin complex with a first eluting solution to obtain a first Sc eluate and combining the first Sc eluate with the first Sc raffinate. In another embodiment of the process, the process also comprises contacting the impure Sc solution with a second ion exchange resin capturing the at least one metal contaminant and Sc so as to produce a second ion exchange resin complex; and eluting Sc from the second ion exchange resin complex with a second eluting solution so as to produce a purified Sc eluate. In the processes of the present disclosure, the concentration of the at least one metal contaminant in the purified Sc eluate or the purified Sc raffinate is lower than the concentration of the at least one metal contaminant in the impure Sc solution. Still in the processes of the present disclosure the first ion exchange resin and the second ion exchange resin are strong acid cationic resins with sulfonic acid functional groups in a potassium or sodium form. In an embodiment, the Sc concentrate is in a dry solid form or in an aqueous solid suspension or a slurry form. In yet another embodiment, the sulfonic acid functional groups are in the sodium form. In yet a further embodiment, the at least one metal contaminant has an oxidation state of at least 3. In still a further embodiment, the at least one metal contaminant is thorium (Th) or zirconium (Zr). In a specific embodiment, the at least one metal contaminant is Th. In still another embodiment, the impure Sc solution has a pH between about 1.5 and about 3.5, such as, for example, a pH between about 3.0 and about 3.5. In yet another embodiment, the acidic solution is a HCl solution. In a further embodiment, the process comprises eluting Sc from the first ion exchange resin complex with a first eluting solution to obtain the first Sc eluate and combining the first Sc eluate with the purified Sc raffinate. In yet another embodiment, the second eluting solution or the second eluting solution is a HCl solution. In still another embodiment, the second ion exchange resin is a gel. In yet another embodiment, the first ion exchange resin is a macroporous resin. In an embodiment, the process further comprises eluting the at least one metal contaminant from the first ion exchange resin complex or the second ion exchange resin complex. In another embodiment, the process further comprises regenerating the first ion exchange resin or the second ion exchange resin in the sodium or potassium form.

According to a second aspect, the present disclosure provides a purified scandium (Sc) eluate obtainable or obtained by the process described herein.

According to a third aspect, the present disclosure provides a purified scandium (Sc) raffinate obtainable or obtained by the process described herein.

According to a fourth aspect, the present disclosure provides a process of making a refined scandium (Sc) oxide product. The process comprises precipitating the purified Sc eluate described herein or the purified Sc raffinate described herein with oxalic acid so as to obtain a precipitated slurry having a solid fraction and a liquid fraction. The process also comprises separating the solid fraction of the precipitated slurry from the liquid fraction of the precipitated slurry so as to obtain a separated solid fraction. The process further comprises calcining the separated solid fraction so as to obtain the refined Sc oxide product. The refined Sc oxide product obtained has a concentration of less than 500 ppm of the at least one metal contaminant.

According to a fifth aspect, the present disclosure provides a refined scandium (Sc) oxide product obtainable or obtained by the process described herein. The refined Sc oxide product has a concentration of less than 500 ppm of the at least one metal contaminant.

BRIEF DESCRIPTION OF THE DRAWINGS

Having thus generally described the nature of the invention, reference will now be made to the accompanying drawings, showing by way of illustration, a preferred embodiment thereof, and in which.

DETAILED DESCRIPTION

Figure 1:
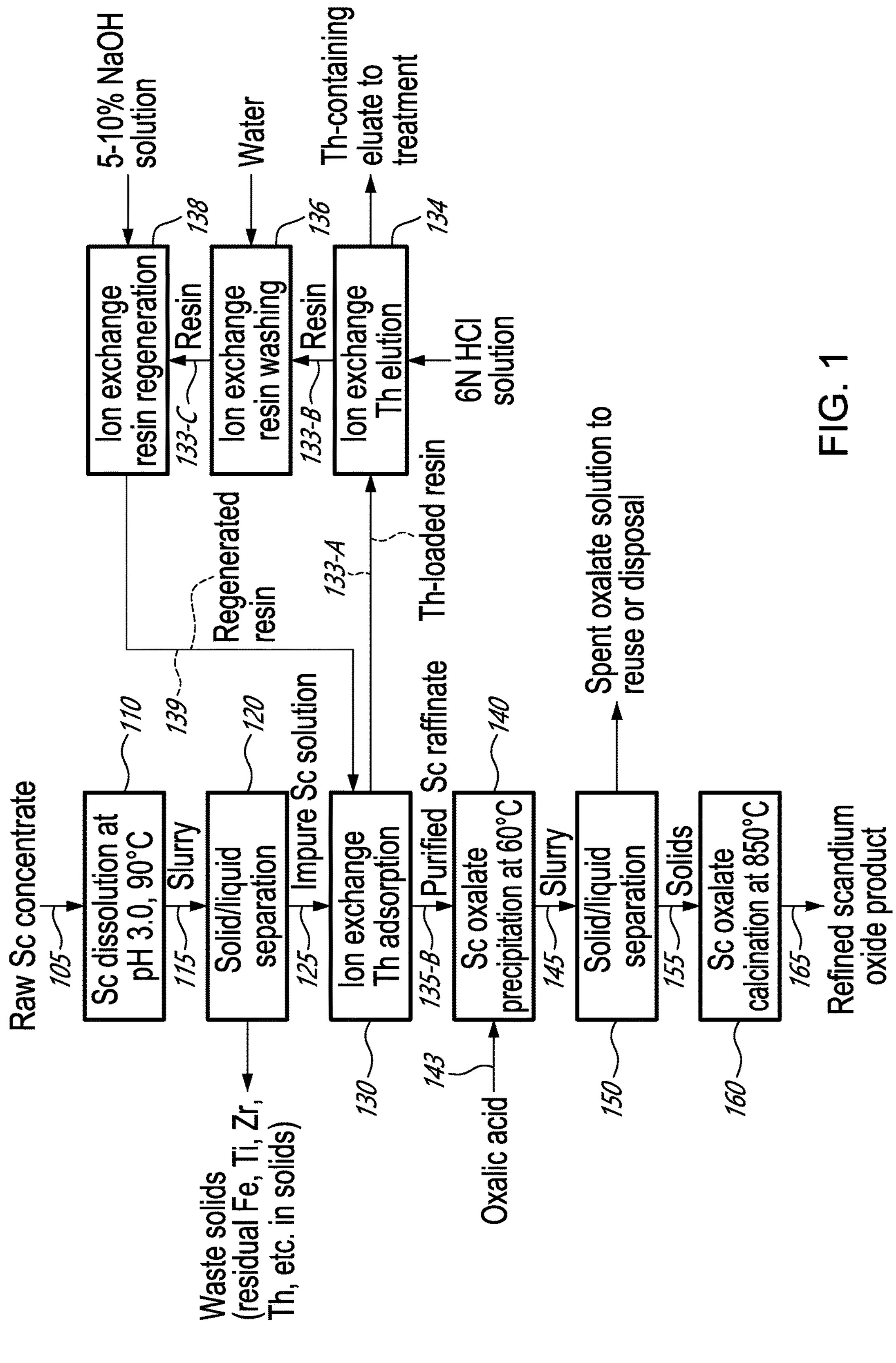
FIG. 1 is a process flow diagram of a first ion exchange process according to one embodiment of a process of removing metal contaminants from a scandium (Sc) concentrate as described herein.

The present disclosure concerns a process for reducing the presence of contaminating metallic elements in a scandium concentrate. As used in the context of the present disclosure, the expression "scandium concentrate" refers to an amorphous (e.g., aqueous solid suspension or slurry) or a crystalline (e.g., dry solid form) scandium carbonate-bicarbonate-hydroxide precipitate. The precipitate can be obtained from processing scandium containing feed material such as liquid effluents and solid residues from titanium dioxide ($TiO_2$) feedstock upgrading plants (UGS process, etc.), from $TiO_2$ pigment production (sulfate or chloride method), from alumina ($Al_2O_3$) production (Bayer process), from nickel ore processing, from zirconium feedstock processing, from uranium ore processing, from tungsten ore processing, etc. The expression "scandium concentrate" also refers to scandium oxide or any other scandium-containing solid compound which contains significant amounts of impurities like thorium, zirconium, etc.

In some embodiments, the scandium concentrate can be obtained by neutralizing a scandium carbonate solution from initial pH about 11.0 to final pH 6.5, with the addition of a strong acid, such as, for example, HCl. The scandium concentrate can be repulped and washed with deionized water, and optionally recovered by filtration. An embodiment of a process for obtaining a scandium concentrate is provided in WO2019/213753, herewith incorporated in its entirety.

In the first step of the process, the Sc concentrate is treated with a strong acid, such as, for example, HCl, to achieve a solution (referred to herein as an impure Sc solution) having a pH between about 1.5 and 3.5 (and in some embodiments about between 3.0 and 3.5, or about 3.0). In an embodiment, the impure Sc solution has a pH of at least about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3 or 3.4, In another embodiment, the impure Sc solution has a pH of no more than about 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7 or 1.6. In a further embodiment, the impure Sc solution has a pH between about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3 or 3.4 and about 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7 or 1.6. In an embodiment, the impure Sc solution has a pH of at least about 3.0, 3.1, 3.2, 3.3 or 3.4, In another embodiment, the impure Sc solution has a pH of no more than about 3.5, 3.4, 3.3, 3.2 or 3.1. In a further embodiment, the impure Sc solution has a pH between about 3.0, 3.1, 3.2, 3.3 or 3.4 and about 3.5, 3.4, 3.3, 3.2 or 3.1. In still another embodiment, the impure Sc solution has a pH of about 3.0. In an embodiment, the impure Sc solution has a Sc concentration of about 1 to 20 g/L, and, in some embodiments, of about 1 to 10 g/L, 2 to 6 g/L or 4 to 5 g/L.

The process of the present disclosure is designed to remove, at least in part, some of the metal contaminants from the Sc concentrate by treating an impure Sc solution. The metal contaminants that can be removed from the impure Sc solution by the process of the present disclosure have an oxidation state (in the impure Sc solution) of at least 3. For example, they can include, but are not limited to thorium (Th), iron (Fe), chromium (Cr) and zirconium (Zr). In a specific embodiment, the metal contaminants that can be removed from the impure Sc solution by the process of the present disclosure can include (and in some embodiments be limited to) thorium (Th) and zirconium (Zr). In a specific embodiment, the metal contaminants that can be removed from the impure Sc solution by the process of the present disclosure can include (and in some embodiments be limited to) thorium (Th). In some embodiments, the concentration of the each metal contaminant in the Sc impure solution is between about 10 to 500 mg/L. In an embodiment, the concentration of the each metal contaminant in the Sc impure solution is at least about 10, 20, 30, 40, 50, 60, 70, 80, 90, 100, 150, 200, 250, 300, 350, 400, 450 mg/mL or more. In another embodiment, the concentration of the each metal contaminant in the Sc impure solution is no more than 500, 450, 400, 350, 300, 250, 200, 150, 100, 90, 80, 70, 60, 50, 40, 30, 20 mg/L or less. In another embodiment, the concentration of the each metal contaminant in the Sc impure solution is between about 10, 20, 30, 40, 50, 60, 70, 80, 90, 100, 150, 200, 250, 300, 350, 400, 450 mg/mL and about 500, 450, 400, 350, 300, 250, 200, 150, 100, 90, 80, 70, 60, 50, 40, 30, 20 mg/L.

Once the impure Sc solution has been obtained, it is contacted with an ion exchange resin. An "ion exchange resin" is understood as a resin having an affinity for a metallic ion of interest. The ion exchange resin that can be used in the process of the present disclosure can be made with particles of so called "chromatographic size" (e.g., average diameter between about 200-400 μm) or of "standard size" (e.g., average diameter between about 300-1200 μm). The particles of the ion exchange resin can be cross-linked prior to being submitted in the process.

The ion exchange resins used in the process of the present disclosure are strong acid cationic resins such as sulfonate cationic resins. In the context of the present disclosure, such ion exchange resins include sulfonic acid moieties capable of capturing metallic ion contaminants and, in some embodiments, Sc too. As it is known in the art, strong cationic resins show no or very little variation in ion exchange capacity (e.g., charges) with changes in pH. In some embodiments, a strong cationic exchange resin shows no or little variation over a pH range between 1 and 14, for example between 2 and 14. This is contrast with weak cationic exchange resins which are only ionized over a limited pH range (2 to 9 for example).

The ion exchange resins used in the process of the present disclosure are in a potassium or sodium form. As it is known in the art, the "form" of an ion exchange resin refers to the countercation which is absorbed on the sulfonic acid functional group prior to the process. In the present disclosure, it is preferred that the ion exchange resin includes potassium or sodium countercations. In a specific embodiment, the ion exchange resin of the present disclosure includes sodium countercations (e.g., in a resin in a sodium form).

In some embodiments of the present disclosure, it is possible to use an ion exchange resin in the form of a gel. Gel resins generally have small pores (e.g., about 1 to 2 nm when hydrated). Embodiments of gel ion exchange resins which can be used in the context of the present disclosure include, but are not limited to, Purolite PCR642™ or SSTC60™, Diaion UBK(8)™.

In other embodiments of the present disclosure, it is possible to use an ion exchange resin in a macroporous form. Macroporous resins generally have large pores (e.g., about 20 to 100 nm when hydrated). Embodiments of macroporous ion exchange resins which can be used in the context of the present disclosure include, but are not limited to, Purolite C150™ or PCR145K™.

In the processes of the present disclosure, two different types of ion exchange resins can be used. In a first embodiment, the process uses a first ion exchange resin which preferentially captures the metal contaminant but not Sc (at least not in a substantive manner). In this first embodiment, the metal contaminant(s) forms a complex with the first ion exchange resin (e.g., a loaded resin or a second ion exchange resin complex). Furthermore, when the first ion exchange resin is used, a Sc raffinate is obtained. In this first aspect, since some Sc may be captured by the resin, it is possible to elute Sc from the first ion exchange resin complex (e.g., the loaded resin) to obtain a first Sc eluate which can optionally be combined with the Sc raffinate. In the first aspect of the process using a first ion exchange resin, a macroporous resin can be used.

In a second embodiment, the process uses a second ion exchange resin which is capable of capturing and forming a complex with both the metal contaminant and the Sc present in the impure Sc solution. When the second ion exchange resin is used, it is necessary to elute the captured Sc from the resin to obtain a second Sc eluate. The elution step can be performed by contacting, for example, the second ion exchange resin complex (e.g., the loaded resin) with a second eluting solution. The person skilled art would know how to select an eluting solution suitable to obtain the second Sc eluate. In an embodiment, the eluting solution is a strong acid eluting solution, such as, for example, an HCl solution (for example a 1N HCl solution, a 2N HCl solution or a 3N HCl solution). In the second embodiment of the process using a first ion exchange resin, a macroporous or gel resin can be used.

In the processes of the present disclosure, it is possible, once the Sc eluate and/or raffinate have been obtained, to regenerate the resin to undertake a new ion exchange cycle. In such embodiment, the first and/or second ion exchange resin may be submitted to an elution step with a further eluting solution so as to remove the metal contaminants which may have been captured by the resin. The person skilled art would know how to select an eluting solution suitable to remove, at least partially or the majority of, the captured metal contaminants. In an embodiment, the eluting solution is a strong acid eluting solution, such as, for example, an HCl solution (for example a 4N HCl solution, a 5N HCl solution, a 6N HCl solution, or a 8N HCl solution). The eluted metal contaminants may be further treated or discarded.

The processes of the present disclosure can further include steps for generating a refined scandium oxide product. The scandium oxide obtained using the purified Sc eluate and/or Sc raffinate described herein can have, in some embodiments, a level of each metal ion contaminant (e.g., metallic contaminant) below about 500, 450, 400, 350, 300, 250, 200, 150, 100, 90, 80, 70, 60, 50, 40, 30 or 10 ppm. In embodiments in which the scandium concentrate includes Th as a metal ion contaminant, the scandium oxide obtained using the purified Sc eluate and/or raffinate described herein can have, in some embodiments, a level of Th below about 500, 450, 400, 350, 300, 250, 200, 150, 100, 90, 80, 70, 60, 50, 40, 30 or 10 ppm.

An embodiment of the first embodiment of the process using a first ion exchange resin capable of preferentially capturing the metal contaminant and Sc is shown at step 130 of FIG. 1. In preliminary steps, a raw Sc concentrate 105 can be dissolved at step 110 at pH between 1.5 and 3.5, for example at a pH of 3.0, and heated to a temperature between 20 to 100° C., and such as, for example, at about 90° C. Dissolution step 110 can be done using a concentrated acid, such as, for example HCl. The dissolution step generates a slurry 115 which is submitted to a solid/liquid separation step 120. The solid residue (which may include, for example, Fe, Ti, Zr, Th, etc.) obtained after step 120 can be discarded as waste solids. The separated liquid obtained at step 120 is considered an impure Sc solution 125. In FIG. 1, an impure Sc solution containing Th as a metal ion contaminant is shown. The impure Sc solution is loaded on a first ion exchange resin at step 130 to generate a loaded resin 133-A (also referred to as a first ion exchange resin complex) including the metal ion contaminant (Th in FIG. 1). Because the first ion exchange resin does not substantially capture Sc, step 130 generates a purified Sc raffinate 135-B. The loaded resin 133-A can be submitted to an elution step to gather the Sc metallic ion which may have been captured on the first ion exchange resin (not shown in FIG. 1). The purified Sc raffinate 135-B (optionally in combination with the Sc eluate obtained) can be submitted to a precipitation step 140 whereby oxalic acid 143 is added. The precipitation step 140 can be conducted at a temperature of 20 to 100° C., such as, for example, at about 60° C. The precipitation step can generate a slurry 145 which can be submitted to a solid/liquid separation step 150. The solids 155 obtained from the separation step 150 can be submitted to a calcining step 160 and the spent oxalate solution can be disposed or reused. Calcining step 160 can include a step of submitting the solids 155 to a temperature of 600 to 1000° C., (such as, for example, at about 900° C.) until a refined scandium oxide product 165 is obtained.

FIG. 1 also includes the steps to regenerate the resin once a purified Sc raffinate 135-B and optionally the Sc eluate have been obtained. In order to do so, resin 133-A can be submitted to elution step 134 using a strong acid solution, such as, for example, a 6N HCl solution as shown on FIG. 1. The eluate from step 134 can be further treated. Resin 133-B obtained after step 134 can be washed, at step 136, with an aqueous solution, such as for example, water as shown on FIG. 1. Washed resin 133-C obtained from step 136 can be regenerated at step 138 using a basic solution, such as, for example, a 5-10% NaOH solution. The basic solution added at step 138 includes a sodium or a potassium ion. The regenerated resin 139 can be used at step 130 to perform the ion exchange step.

Figure 2:
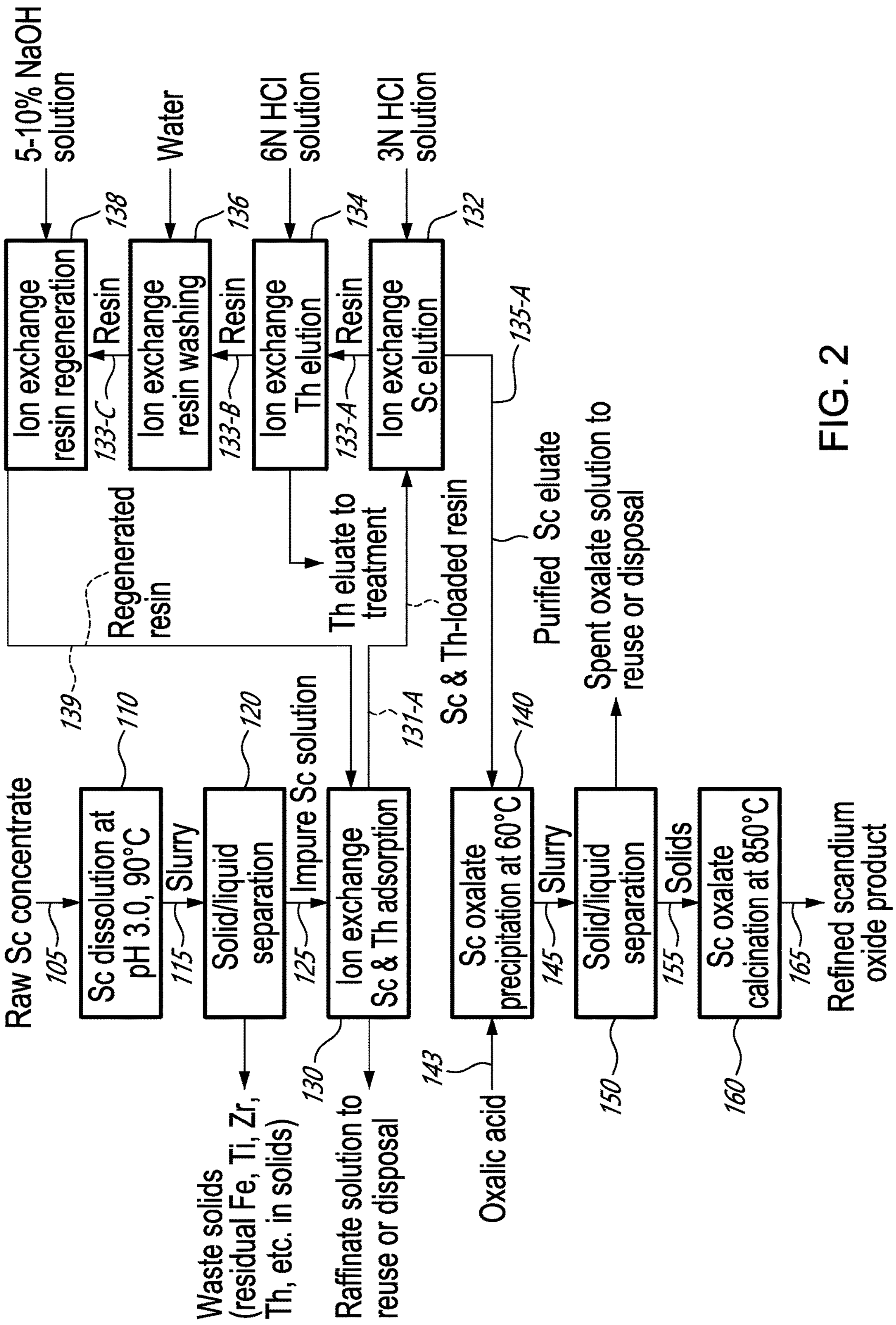
FIG. 2 is a process flow diagram of a second ion exchange process according to another embodiment of a process of removing metal contaminants from a scandium (Sc) concentrate as described herein.

An embodiment of the second embodiment of the process using a second ion exchange resin capable of capturing both the metal contaminant and Sc is shown at steps 130 and 132 of FIG. 2. Prior to steps 130 and 132, a raw Sc concentrate 105 can be dissolved at step 110 at pH between 1.5 and 3.5, for example at pH 3.0, and heated to a temperature between 20 to 100° C., such as, for example, at about 90° C. Dissolution step 110 can be done using a concentrated acid, such as, for example HCl. The dissolution step generates a slurry 115 which can be submitted to a solid/liquid separation step 120. The solid residue (which may include, for example, Fe, Ti, Zr, Th, etc.) obtained after step 120 can be discarded as waste solids. The separated liquid obtained at step 120 is considered an impure Sc solution 125. In FIG. 2, an impure Sc solution containing Th as a metal ion contaminant is shown. The impure Sc solution is loaded on a first ion exchange resin at step 130 to generate a loaded resin 131-A (also referred to as a second ion exchange resin complex) including both Sc and Th. In order to separate Sc from the metal ion contaminant (e.g., Th in FIG. 2), the resin is submitted to an elution step 132. At elution step 132, a strong acid, such as a 3N HCl solution as shown on FIG. 2, is applied to the loaded resin 131-A to obtain a purified Sc eluate 135-A. The acid used to elute Sc must be just strong enough to remove Sc from the resin and leave behind most of the metal ion contaminant (e.g., Th in FIG. 2) and most of other contaminants. The purified Sc eluate 135-A can be submitted to a precipitation step 140 whereby oxalic acid 143 is added. The precipitation step 140 can be conducted at a temperature of 20 to 100° C., such as, for example, at about 60° C. The precipitation step 140 generates a slurry 145 which can be submitted to a solid/liquid separation step 150. The solids 155 obtained from separation step 150 can be submitted to a calcining step 160 and the spent oxalate solution can be disposed or reused. The calcining step 160 can include a step of submitting the solids 155 to a temperature of 600 to 1000° C., and such as, for example, at about 900° C. until a refined scandium oxide product 165 is obtained.

FIG. 2 also includes the steps to regenerate the resin once a purified Sc eluate 135-A has been obtained. In order to do so, resin 133-A can be submitted to elution step 134 using a strong acid solution, such as, for example, a 6N HCl solution as shown on FIG. 2. Because the second ion exchange resin has more affinity for the metal contaminant than for Sc, the acidic solution used to eluate the metal ion contaminant of resin 133-A is of higher normality than the acidic solution used to eluate Sc of resin 131-A. The eluate from step 134 can be further treated. Resin 133-B obtained after step 134 can be washed, at step 136, with an aqueous solution, such as for example, water as shown on FIG. 2. Washed resin 133-C obtained from step 136 can be regenerated at step 138 using a basic solution, such as, for example, a 5-10% NaOH solution. The basic solution at step 138 includes a sodium or a potassium ion (not specifically shown on FIG. 2). The regenerated resin 139 can be used at step 130 to perform the ion exchange step.

The skilled person in the art appreciates that the final purity of the scandium oxide product 165 is directly affected by the initial purity of the scandium eluate or raffinate obtained after the ion exchange steps 130 (and optionally 132). The process described herein increases the final purity of the scandium oxide product by increasing the purity of the scandium eluate.

EXAMPLE I—THE EFFECT OF RESIN CONDITION ($H^+$ FORM, OR $Na^+$ FORM) ON ITS SELECTIVITY FOR SCANDIUM AND THORIUM

Selectivity tests were performed with two strong cationic (sulfonate) gel-type resins in $H^+$ form (i.e., with protons occupying the active sites of the resin) or in $Na^+$ form (i.e., with sodium cations occupying the active sites of the resin). In each test, 15 mL resin, and 100 mL impure scandium solution containing 4-5 g/L Sc at pH 3.0, were mixed in a beaker under ambient temperature for 12 h so as to reach equilibrium. The resins had been initially received in $H^+$ form. For the tests with the resins in $Na^+$ form, the resins were pre-conditioned for few hours with sodium hydroxide solution (5% w/w NaOH). After each test, the solutions were recovered by filtration and analyzed for their scandium and thorium contents. As shown in Table 1, the resins in $Na^+$ form were more selective for scandium in comparison to thorium. About 98% of thorium was adsorbed on the resins in $H^+$ form, when only 15% to 20% of thorium was adsorbed on the resins in $Na^+$ form.

Table 1. Results from selectivity tests with two strong cationic (sulfonate) gel-type resins in $H^+$ form and in $Na^+$ form.

| | | Concentration (mg/L) | | | |
|---|---|---|---|---|---|
| Resin | Form | Sc initial | Sc final | Th initial | Th final |
| Diaion | $H^+$ form | 4100 | 1400 | 20 | 0.4 |
| UBK (8) | $Na^+$ form | 4400 | 1100 | 34 | 29 |
| Purolite | $H^+$ form | 4030 | 1300 | 20 | 0.3 |
| SSTC60 | $Na^+$ form | 4030 | 1400 | 21 | 17 |

EXAMPLE II—THE EFFECT OF pH OF THE IMPURE SCANDIUM SOLUTION ON THE RESIN SELECTIVITY FOR SCANDIUM AND THORIUM

To evaluate the effect of pH of the impure scandium solution on the selectivity of strong cationic (sulfonate) resins for scandium and thorium, tests were performed with gel-type chromatographic resin Purolite PCR642 and impure scandium solution containing 4-5 g/L Sc and acidified with HCl at different pH values. All tests were conducted in a beaker with 15 mL resin and 100 mL impure scandium solution mixed together under ambient temperature for 12 hours so as to reach equilibrium. Prior to the tests, the resin had been conditioned in $Na^+$ form by contacting it with sodium hydroxide solution (5% w/w NaOH) solution for few hours. After each test, the solutions were recovered by filtration and analyzed for their scandium and thorium contents. As shown on Table 2, the resin selectivity for scandium is higher at relatively higher pH values. The optimal pH for best selectivity lies between 3.0 and pH 3.5. At these pH values, 75% of scandium was adsorbed in comparison to less than 25% of thorium adsorbed. At pH >3.5, scandium losses were significant because scandium started precipitating in a solid form.

Table 2. Results from tests with feed (impure) scandium solution at different pH values, and gel-type chromatographic resin Purolite PCR642.

| | Concentration (mg/L) | | | |
|---|---|---|---|---|
| pH | Sc initial | Sc final | Th initial | Th final |
| 1.5 | 5300 | 3000 | 32 | 8 |
| 2.0 | 4700 | 2900 | 29 | 16 |
| 2.5 | 5000 | 2800 | 37 | 23 |
| 3.0 | 4600 | 1100 | 36 | 28 |
| 3.5 | 4700 | 1600 | 37 | 30 |

EXAMPLE III—THE EFFECT OF RESIN TYPE (GEL-TYPE, OR MACROPOROUS) AND PARTICLE SIZE (STANDARD, OR CHROMATOGRAPHIC) ON ITS SELECTIVITY FOR SCANDIUM AND THORIUM

To evaluate the effect of resin type (gel-type, or macroporous) and resin particle size (standard 300-1200 μm, or chromatographic 200-400 μm) on the selectivity for scandium and thorium, tests were performed with different strong cationic (sulfonate) resins, and impure scandium solution containing 4-5 g/L Sc and acidified with HCl at pH 3.0. All tests were conducted in a beaker with 15 mL resin and 100 mL impure scandium solution mixed together under ambient temperature for 12 hours so as to reach equilibrium. Prior to the tests, the resin had been conditioned in $Na^+$ form by contacting it with sodium chloride (5% w/w NaOH) solution for few hours. After each test, the solutions were recovered by filtration and analyzed for their scandium and thorium contents. As shown on Table 3, the macroporous resins adsorbed nearly 100% of thorium in solution. Also, the results of Table 3 showed that resins of chromatographic particle size exhibited higher selectivity for thorium than for scandium.

Table 3. Results from tests with strong cationic (sulfonate) resins of different types and sizes.

| | Concentration (mg/L) | | | |
|---|---|---|---|---|
| Resin type and size | Sc initial | Sc final | Th initial | Th final |
| Gel-type, standard size Purolite SSTC60 | 5100 | 1400 | 21 | 17 |
| Macroporous, standard size Purolite C150 | 5000 | 1650 | 21 | 0.1 |
| Gel-type, chromatographic size Purolite PCR642 | 4600 | 1100 | 36 | 28 |
| Macroporous, chromatographic size Purolite PCR145 | 5100 | 2300 | 21 | <0.1 |

EXAMPLE IV—COLUMN PURIFICATION OF IMPURE SCANDIUM SOLUTION USING A GEL-TYPE RESIN

Continuous column tests were performed with UBK(8) resin from Diaion (strong cationic resin (sulfonate in $Na^+$-form) made of polystyrene gel crosslinked with divinylbenzene). The adsorption was conducted in a column having 1.5 cm diameter and containing 12 mL resin volume, with a flow of impure scandium solution about 5 mL/min. The resin was washed using 100 mL water at a flow of 10 mL/min. Scandium was eluted with 100 mL of 3N HCl solution at a flow of 5 mL/min. The total recovery of scandium from the impure scandium solution to the scandium eluate was 73%, while that of thorium was only 2.7%, indicating the high selectivity of scandium versus thorium. Thorium was finally eluted from the resin with 300 mL 6N HCl solution at a flow of 5 mL/min.

Four cycles of adsorption (80 mL of acidified impure scandium solution at 5 mL/min), washing (30 mL water at 5 mL/min), scandium elution (100 mL of 3N HCl solution at 5 mL/min), thorium elution (300 mL of 6N HCl solution at 5 mL/min), washing (100 mL water at 5 mL/min), and conditioning (50 mL of 5% wt. NaOH solution at 5 mL/min) were performed on the same column. The scandium eluates were combined, and scandium was precipitated as scandium oxalate with the addition of 50 mL of 240 g/L hot oxalic acid solution. The precipitate was filtered, washed with deionized water, and calcined overnight at 850° C. The thorium content of the final product (scandium oxide) was determined by inductively coupled plasma mass spectrometry (ICP-MS), and it was found to be 410±25 ppm (mg/kg). The chemical analysis of the initial solution (acidified impure scandium solution), the solution treated with the resin (raffinate), the scandium eluate and the precipitated product obtained is presented in Table 4.

Table 4. Chemical analysis of the initial solution, the raffinate, the scandium eluate and the filtrate of scandium oxalate precipitation.

| | Concentration (mg/L) | | |
|---|---|---|---|
| Element | Initial solution at pH 3.0 | Solution treated with UBK(8) | Sc eluate (with 3N HCl) |
| Cr | 0 | 0.5 | <0.5 |
| Fe | 54 | 22.7 | 22 |
| Mn | 0 | 0.1 | <0.1 |
| Ni | 0 | 0.1 | <0.1 |
| Ti | 22 | 14.9 | <0.1 |
| V | 0 | 0.1 | <0.1 |
| Zr | 37 | 25.9 | 4.0 |
| Mg | 0 | 0.1 | <0.1 |
| Cu | 0 | 0.1 | <0.1 |
| Sc | 4700 | 637 | 3050 |
| Nd | 0 | 0.1 | <0.1 |
| Al | 12.6 | 2.4 | 5.13 |
| Ca | 0 | 3.46 | 5.71 |
| Na | 1000 | 5300 | 1300 |
| P | 0 | 10.7 | <0.1 |
| Y | 0 | 0.1 | <0.1 |
| Si | 28 | 20 | 5.88 |
| U | 0.9 | 0.4 | 0.3 |
| Th | 20.5 | 11.7 | 2.7 |

Figure 3:
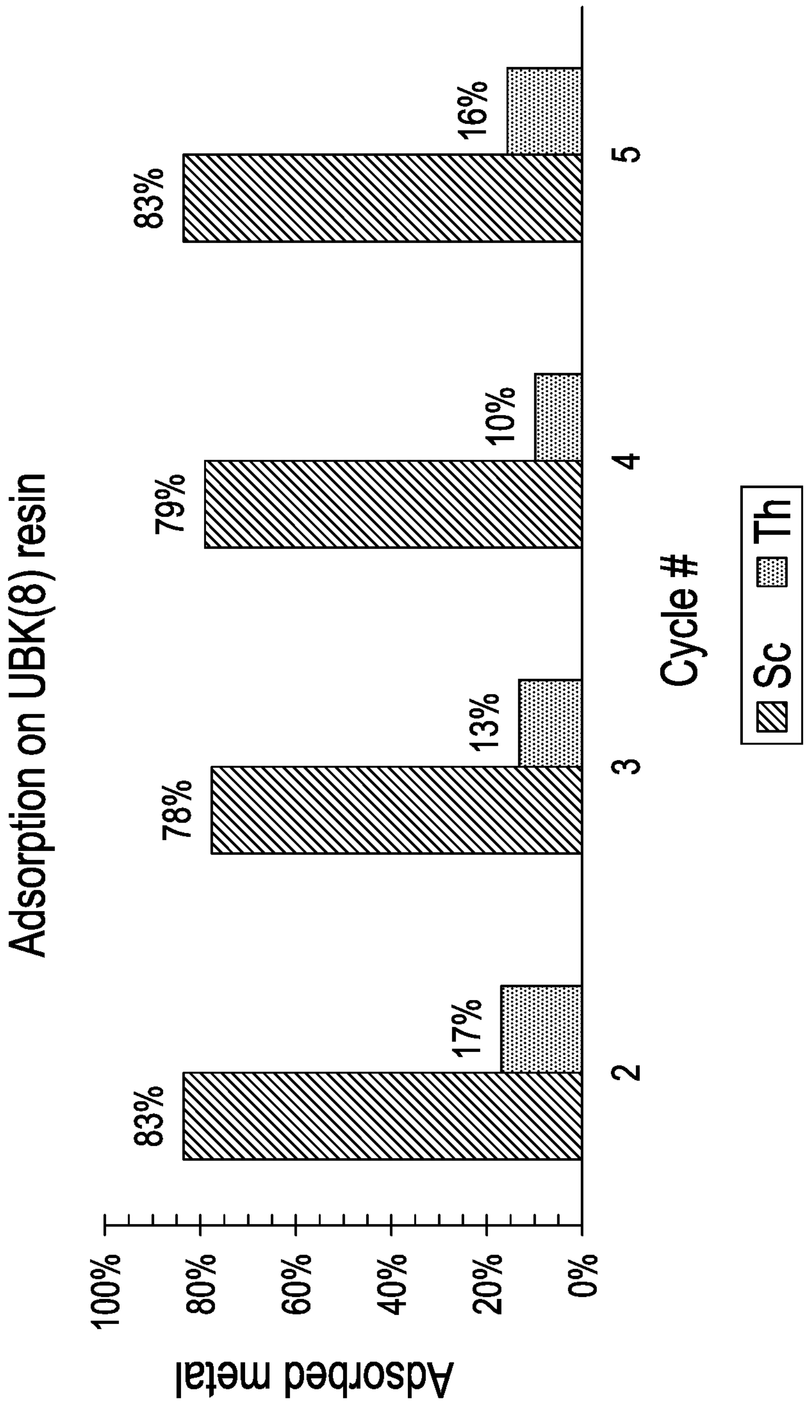
FIG. 3 provides the percentage of retention on gel-type resin of scandium (left column for each condition) and thorium (right column for each condition) as a function of the number of cycles of treatment. The percentage of retention is provided as a numeral on top of each columns.

The stability of the resin after four cycles of treatment as described above was determined. As shown on FIG. 3, the adsorption of scandium remained stable with 81±3% of Sc adsorbed in each pass, which is equivalent to an average resin capacity of about 21 g/L Sc. As also shown on FIG. 3, the adsorption of thorium was low, at 14±3% in each pass.

EXAMPLE V—SELECTIVITY TESTS AND COLUMN PURIFICATION OF IMPURE SCANDIUM SOLUTION USING A MACROPOROUS RESIN

Selectivity tests were performed with PCR145K resin from Purolite (strong cationic resin (sulfonate in $Na^+$-form) made of macroporous polystyrene beads crosslinked with divinylbenzene).

For the selectivity tests, 5-15 mL of resin was mixed with 100-200 mL of impure scandium solution (~5 g/L Sc at pH 3.0) under ambient temperature for 12-16 h. After each test, the solution was analyzed again for its scandium and thorium contents. It was thus observed that the resin adsorbed 97% of thorium and only 7% of scandium (see Table 5 below, test 4).

Table 5. Effects of the variables tested on the adsorption of scandium and thorium

| | | Time | Initial concentration (mg/L) | | Final concentration (mg/L) | | Adsorbed Sc | Adsorbed Th |
|---|---|---|---|---|---|---|---|---|
| Test | Resin/Solution | (h) | Th | Sc | Th | Sc | (%) | (%) |
| 1 | 15 mL resin/ 100 mL solution | 16 | 20.9 | 5100 | 0.08 | 2300 | 55 | 99.6 |

-continued

| Test | Resin/Solution | Time (h) | Initial concentration (mg/L) Th | Initial concentration (mg/L) Sc | Final concentration (mg/L) Th | Final concentration (mg/L) Sc | Adsorbed Sc (%) | Adsorbed Th (%) |
|---|---|---|---|---|---|---|---|---|
| 2 | 5 mL resin/ 100 mL solution | 16 | 20.9 | 5100 | 0.26 | 4300 | 16 | 98.8 |
| 3 | 5 mL resin/ 200 mL solution | 16 | 20.9 | 5100 | 0.50 | 4600 | 10 | 97.6 |
| 4 | 10 mL resin/ 100 mL solution | 16 | 42.8 | 9600 | 1.31 | 8950 | 7 | 96.9 |
| 5 | 5 mL resin/ 200 mL solution | 2 | 21.1 | 4950 | 6.67 | 4450 | 10 | 68.4 |

The selectivity of the PCR145K resin for thorium was superior compared to the selectivity of corresponding gel-type resins (such as those described in Example IV, see Table 6).

Table 6. Comparison of the gel-type and macroporous-type resins.

| Resin | $Sc_2O_3$ equivalent production (g/L resin) | Sc recovery (%)* | Th removal rate (%) |
|---|---|---|---|
| Diaion UBK(8) [gel] | ~25 | 71 | 78 |
| Purolite SSTC60 [gel] | ~25 | 73 | 81 |
| Purolite PCR145K [macroporous] | ~178 | 92 | 98 |

*Adsorbed Sc for gel-type resins and non-adsorbed Sc for the Purolite ® PCR145K resin.

Continuous column tests were also performed with resin PCR145K. The adsorption was conducted in column having 1.5 cm diameter and containing 12 mL resin, with 200 mL of impure scandium solution at a flow between 1 mL/min. The resin was washed with 30 mL water at a flow of 10 mL/min. Thorium was eluted with 300 mL 6N HCl solution at a flow of 5 mL/min. The resin was conditioned using 100 mL 5% w/w NaOH solution at a flow of 5 mL/min.

Oxalic acid was added to the raffinate (the solution that after Th adsorption on PCR145K resin) to precipitate scandium oxalate, and to determine the purity of the final scandium oxide product. The precipitation of scandium oxalate was done with the addition of 50 mL of 240 g/L hot oxalic acid solution to about 200 mL of scandium-containing raffinate. The scandium oxalate precipitate was filtered, washed with water, was calcined overnight at 850° C. to convert it to scandium oxide. The initial solution feed solution (impure scandium solution at pH 3.0), the raffinate, and the filtrate after scandium oxalate precipitation were analyzed by ICP-MS. The mass balance (based on chemical analyses) is presented in Table 7.

Table 7. Mass balance of the initial solution, the raffinate (solution treated with PCR145K), and the solution after scandium oxalate precipitation.

| | Initial solution pH 3.0 (mg) | Raffinate (mg) |
|---|---|---|
| Cr | 9.504 | 1.868 |
| Fe | 28.60 | 7.526 |
| Mn | 0.096 | 0 |
| Ni | 0.72 | 0.79 |
| Ti | 11.04 | 0 |
| V | 0.24 | 0 |
| Zr | 20.25 | 0.338 |
| Mg | 0.048 | 0.188 |
| Cu | 0 | 0 |
| Sc | 2448 | 1900 |
| Nd | 0 | 0 |
| Al | 1.77 | 2.274 |
| Ca | 0 | 2.218 |
| Na | 528 | 938 |
| P | 11.71 | 0.618 |
| Y | 0 | 0 |
| Si | 14.54 | 14.20 |
| U | 0.432 | 0.442 |
| Th | 8.928 | 0.186 |

The final scandium oxide product was analysed for its thorium content and it was found to be only 56±13 ppm (mg/kg), well below the specification for commercial applications (typically less than 150 ppm Th).

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. A process for removing at least one metal contaminant from a scandium (Sc) concentrate, the process comprising:

a) contacting the Sc concentrate with an acidic solution so as to produce an impure Sc solution; and b) contacting the impure Sc solution with a first ion exchange resin capturing the at least one metal contaminant so as to produce a first ion exchange resin complex and a purified Sc raffinate solution, wherein the first ion exchange resin has more affinity for the at least one metal contaminant than for Sc; and optionally eluting Sc from the first ion exchange resin complex with a first eluting solution to obtain a first Sc eluate and combining the first Sc eluate with the purified Sc raffinate solution; or contacting the impure Sc solution with a second ion exchange resin capturing the at least one metal contaminant and Sc so as to produce a second ion exchange resin complex; and eluting Sc from the second ion exchange resin complex with a second eluting solution so as to produce a purified Sc eluate;

wherein a concentration of the at least one metal contaminant in the purified Sc eluate or the purified Sc raffinate solution is lower than a concentration of the at least one metal contaminant in the impure Sc solution; and wherein the first ion exchange resin and the second ion exchange resin are strong acid cationic resins with sulfonic acid functional groups in a potassium or sodium form.

2. The process of claim 1, wherein the at least one metal contaminant has an oxidation state of at least 3.

3. The process of claim 2, wherein the at least one metal contaminant is thorium (Th) or zirconium (Zr).

4. The process of claim 3, wherein the at least one metal contaminant is Th.

5. The process of claim 1, wherein the impure Sc solution has a pH between about 1.5 and about 3.5.

6. The process of claim 5, wherein the impure Sc solution has a pH between about 3.0 and about 3.5.

7. The process of claim 1, further comprising eluting the at least one metal contaminant from the first ion exchange resin complex or the second ion exchange resin complex.

8. The process of claim 7 further comprising regenerating the first ion exchange resin or the second ion exchange resin in the potassium or sodium form.

9. The process of claim 1, wherein the Sc concentrate is in a dry solid form or in an aqueous solid suspension form.

10. The process of claim 1, wherein the sulfonic acid functional groups are in the sodium form.

11. The process of claim 1, wherein the acidic solution is a HCl solution.

12. The process of claim 1, comprising eluting Sc from the first ion exchange resin complex with a first eluting solution to obtain the first Sc eluate and combining the first Sc eluate with the purified Sc raffinate solution.

13. The process of claim 1, wherein the first eluting solution or the second eluting solution is a HCl solution.

14. The process of claim 1, wherein the second ion exchange resin is a gel.

15. The process of claim 1, wherein the first ion exchange resin is a macroporous resin.

16. The process of claim 1, wherein the impure Sc solution has a pH between about 2.5 and about 3.5.

* * * * *